March 23, 1965  F. E. EDLIN  3,174,915
AIR SUPPORTED SOLAR STILL
Filed July 16, 1962

INVENTOR
FRANK E. EDLIN

BY

ATTORNEY 3,174,915
AIR SUPPORTED SOLAR STILL
Frank Edward Edlin, Wilmington, Del., assignor to E. I. du Pont de Nemours and Company, Wilmington, Del., a corporation of Delaware
Filed July 16, 1962, Ser. No. 211,942
1 Claim. (Cl. 202—234)

This invention relates to stills and more particularly to single-effect stills which operate by the absorption of solar energy. This invention also relates to a prefabricated assembly for use in such stills.

Because of the need to turn to sea water or other saline water as a source of fresh water, increasing emphasis has been placed in recent years on solar distillation. Solar stills which operate by the absorption (as contrasted with reflection) of solar energy generally comprise a roof or canopy through which solar radiation passes and a radiation-absorptive surface beneath the aforementioned canopy which converts the solar radiation to heat which is conducted directly to the liquid being distilled. The distillate may condense on the inner surface of the roof or canopy through which the solar radiation passes or it may condense on another cooled surface.

Two approaches have ben made to absorption-type solar stills. First, relatively compact multi-effect stills, that is, stills that re-use the heat vaporization of the liquid distilled, have ben constructed. Although these stills have comparatively high output per unit area, the total output of such stills is relatively small. Attempts to make large multi-effect stills have resulted in prohibitively high construction costs. Also, multi-effect stills are comparatively difficult and costly to operate.

Second, large single-effect stills, that is, stills that do not re-use the heat of vaporization of the liquid distilled, have been constructed. Such stills usually have either a rigid or supported flexible canopy through which solar radiation passes and, usually, on which the distillate condenses. Although such large single-effect stills are cheaper to construct and operate than multi-effect stills of comparable size, they have several disadvantages. First, such stills often fail mechanically. For example, if the canopy through which solar radiation passes and on which the distillate condenses is thin enough to be economical and permit high transmission of solar radiation, hail, wind or the like often puncture or break the canopy. Also, for example, if the canopy is flexible and supported on a rigid framework, the motion of the canopy causes mechanical failure at the supports. Furthermore, conventional construction and fabrication techniques often limit the size of such stills. Also, such large stills often present undesirable air foils and, for example, in high winds the still may be torn from its supports and blown away. In addition, such single-effect stills often make ineffective use of solar radiation. For example, such stills are often constructed so that a considerable portion of the canopy through which solar radiation is transmitted is at such an angle to the incident radiation that the radiation is reflected rather than transmitted.

Furthermore, the efficiency of both single and multi-effect stills often greatly decreases with time. For example, salt and other organic and inorganic solids in the material being distilled precipitate on absorbing surfaces causing these surfaces to reflect rather than absorb solar radiation.

This invention provides an efficient single-effect solar still which efficiently utilizes solar radiation, which is resistant to mechanical failure, which is inexpensive, which does not provide an undesirable air foil and which does not decrease in efficiency with time. One preferred embodiment of this invention also provides a prefabricated envelope for the aforementioned stills comprising a transmitting-condensing surface and an absorbing layer. This prefabricated envelope can be supplied in roll form and cut at the site of use to make stills of any desired area.

The solar stills of this invention comprise an inflated, flexible, substantially transparent arched canopy having an arc length of about 1.01 to 1.2, and preferably about 1.01 to 1.1 times the chord thereof, means running along the edges of said canopy to hold said canopy and collect distillate condensing on the inner surface thereof and disposed beneath said canopy a loose non-woven black fabric. In a preferred embodiment of this invention, the aforementioned canopy and fabric are a part of a prefabricated assembly which comprises a flexible, usually open ended, envelope the top layer of which is substantially transparent and disposed within said envelope a loose non-woven black fabric, said fabric being free from the top layer of the envelope and at least a major portion thereof being free from the bottom layer of the envelope.

Preferred embodiments of this invention are illustrated in the accompanying drawing wherein.

Figure 1:
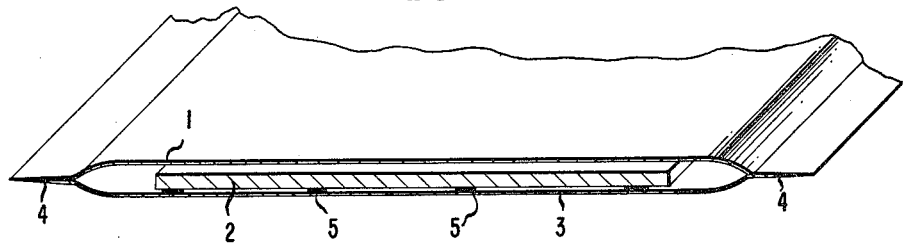
FIGURE 1 is an oblique cross-sectional view of the preferred prefabricated envelopes used in the solar stills of this invention.

Canopy 1 is formed from a flexible sheet material which must be strong, impervious to water and air, weather resistant and substantially transparent to solar radiation. Although the transparent canopy need not be completely transparent to all solar radiation, that is, it may not be transparent to ultraviolet radiation, some of the long wave-length infrared radiation or some visible radiation, it should be substantially transparent to the total incident solar energy. Thus "substantially transparent" is used herein to refer to materials which transmit at least about 70% of the incident solar radiation which strikes the material at or near normal incidence. Materials which fulfill these qualifications are, for example, films of polyvinyl fluoride; polytetrafluoroethylene; copolymers of tetrafluoroethylene with, for example, hexafluoropropene, monochlorotrifluoroethylene, vinylidene chloride, vinyl fluoride and the like; polyesters such as polyethylene terephthalate; polyethylene; polyvinyl butyral; polyvinyl chloride; copolymers of vinyl chloride with, for example, styrene, acrylonitrile, vinylidene chloride, vinyl acetate and the like and homopolymers and copolymers of vinylidene chloride. Laminated films can also be used. In addition, coated fabrics fulfilling the aforementioned qualifications, for example, open scrim glass fabrics coated and impregnated with polytetrafluoroethylene, can be used. Films of fluorinated hydrocarbon polymers are preferred because they have excellent solar-radiation transmission characteristics and resistance to hydrolysis and photo-degradation. Films of polyvinyl fluoride are particularly preferred because they have outstanding transmissibility to solar radiation, excellent weatherability and a combination of high tensile strength, flexibility and toughness. Even after prolonged use, films of polyvinyl fluoride do not scale or become opaque and do not become brittle or fail mechanically. Furthermore, as discussed hereinafter, films of polyvinyl fluoride can be easily modified to make the surface thereof wettable.

The thicknesses of the canopy 1 usually range from about 1 to 8 mils. Very thick canopies, for example, 100 mils or more thick are usually avoided because they are expensive, they somewhat reduce the transmission of solar energy, they are often stiff and inflexible and are often more subject to mechanical damage. The minimum thickness of the canopy 1 is largely governed by the strength of the films. The length and width of the canopy 1 are governed largely by the desired distilling area of the still. Canopy 1 must be from about 3 to 15 feet wide and is preferably from about 30 to 500 feet long. However, for example, stills thousands of feet long are feasible.

Preferably, the inner condensing surface of the canopy is made wettable. "Wettable" as used herein refers to a surface on which water or other liquid being distilled condenses as a film rather than collecting in droplets which substantially increase reflection, rather than transmission, of incident solar radiation. A still having a canopy 1 with a wettable inner surface will produce 10 to 25% more distillate than a corresponding still having a canopy 1, the inner surface of which is not wettable.

The inner surface of canopy 1 can be made wettable, for example, by coating the surface to be modified with a thin coating of colloidal or near colloidal silica, drying the coating and simultaneously or subsequently heating and pressing the silica particles into the surface of the film, for example, in a calender. Preferably, an organic solvent which partially solubilizes the surface being modified is added to the aqueous dispersion of silica to facilitate embedding and adhering the particles of silica to the surface. A thin wettable coating, for example, of crosslinked polyvinyl alcohol can also be applied to the inner surface of canopy 1.

The inner surface of canopy 1 can also be roughened to make it wettable. Usually, in order to be wettable, the inner surface of canopy 1 should have at least 50 and preferably at least 200 irregularities or undulations per linear inch. The inner surface of canopy 1 can be roughened, for example, by sanding the surface with sandpaper, by sandblasting with wet sand, or by embossing undulations into the surface, for example, with a calender. The irregularities or undulations can be, for example, on the order of 0.5 to 0.75 mil deep. If irregularities or undulations at a frequency of about from 1000 to 4000 per inch are made on the inner surface of canopy 1, long wavelength radiation reemitted by the still is reflected by canopy 1 without substantially reducing the transmission of incident solar radiation. This reflection of reemitted radiation increases the efficiency of the stills by increasing the temperature within the still.

Loose, non-woven black fabric 2, which serves as a radiation absorbing layer, can be composed of almost any fibers which are resistant to degradation by sunlight and the material being distilled and can be colored black. Such fibers are, for example, fibers of polyacrylonitrile, polyesters such as polyethylene terephthalate, polyester amides, polyamides such as polyhexamethylene adipamide, homopolymers and copolymers of vinyl chloride and vinylidene chloride, glass, cotton and the like. Polyacrylonitrile fibers are particularly preferred. Since salt water is usually distilled in the stills of this invention, fibers in the non-woven fabrics are not only subjected to ultraviolet light and deterioration therefrom but also to strong saline solutions containing, for example, 10% or greater of salt. During prolonged exposure to such conditions, non-woven batts of polyacrylonitrile fibers do not degrade or mat and the fibers therein do not weaken, embrittle or hydrolyze.

For the reason discussed hereinafter, the non-woven fabric 2 of fibers should be loose and open. Usually, non-woven fabrics having a density of about from 0.001 to 0.03 oz./in.$^3$ are used. Preferably, fabric 2 weighs about 1 to 5 oz./sq. yd. and is about 0.2 to 0.5 inch thick. Such fabrics can be prepared by conventional techniques such as carding and crosslapping fibers. In order to give the fabric 2 sufficient body to retain its shape in the solar stills, it can be loosely needle punched or, for example, lightly sprayed with a binder such as, for example, a solution of polychlorobutadiene.

The form of the fibers is not critical. They can be straight or crimped staple fibers, continuous filaments, yarns or the like. Staple fibers having a denier of about 0.5 to 5 and a length on the order of 1 to 6 inches are usually used. One convenient method of making the fibers black is to incorporate, for example, 1 to 5% of very finely divided carbon black in the fiber polymer before spinning.

As mentioned hereinbefore, the loose, nonwoven, black fabric 2 and canopy 1 used in the solar stills of this invention are preferably provided in a prefabricated envelope such as that shown in FIGURE 1, the bottom layer 3 of which becomes the bottom or sealing layer 3 in the still. Optionally, however, each of these elements can be provided separately and incorporated in the still. The advantage of providing canopy 1, non-woven fabric 2 and sealing layer 3 as a single prefabricated assembly is that a single inflatable envelope of any practical length can be provided as a unitary structure which can be rolled up and shipped to the place of installation and there cut into the desired length and installed with a minimum of construction and fabrication at the site of use. Furthermore, by providing a unitary envelope, leaks and the like do not develop along the edge of the still should the canopy 1 partially pull away from the means by which it is held.

The preferred prefabricated envelope can be prepared, for example, by inserting the non-woven fabric 2 between two layers of film (1 and 3), then sealing the edges 4 thereof or by placing the fabric on one-half of a sheet of film and folding the uncovered portion of the film over and sealing one edge of the envelope. Suitable methods for sealing the envelope include pressing edges thereof at a temperature sufficient to fuse the surfaces to be joined, then cooling the joint under pressure or, for example, applying thereto a suitable adhesive such as, for example, solutions of linear polyesters and organic polyisocyanates, epoxy resin adhesives or the like. The envelope can also be extruded as a large tube, fabric 2 fastened at spaced points on the outer surface thereof, then the tube turned inside out.

Preferably, non-woven fabric 2 within the envelope is somewhat narrower than the inner width of the envelope so that the fabric 2 does not extend upward along the holding and collecting means 7 in the inside of the still. The bottom layer 3 of the envelope can and preferably is made of the same material as the top layer 1. Alternately, however, a film of a different polymeric material can be used for the bottom layer 3. Any of the polymeric materials mentioned above which can be used for the top layer 1, which becomes canopy 1 of the still, are suitable for the bottom layer 3, which becomes lower sealing layer 3 of the still.

Non-woven fabric 2 is usually bonded at space points 5, for example, with adhesives such as those mentioned above which can be used to seal the edges of the envelope. Alternately, however, non-woven fabric 2 need not be adhered to either surface of the envelope, in which case weights such as pieces of coal or rock are usually distributed on the fabric after the envelope is installed to prevent the fabric being displaced by the liquid being distilled. Preferably, the fabric should not be bonded to the entire bottom layer 3 of the envelope since this prevents the fabric from floating on top of the liquid being distilled.

Considering the construction and installation of the solar stills of this invention in more detail, first, a suitable substantially level site is chosen and, preferably with long stills, graded toward the end thereof from which residue and distillate are removed. Typically, a grading of ½ to 2% is used. Particularly with small stills not having many repeating still units, it is sometimes desirable to lay an insulating material 6 under the still. Suitable insulating materials are, for example, expanded mica, sawdust, dry sand, wood shavings, paper pulp, cork, straw and the like. Next, holding and collecting means 7 are laid on the surface prepared for the still. These holding means can be made from concrete, steel, wood, extruded plastics or the like. However, they should be heavy enough to prevent the holding means from rising off the ground when the still is inflated or bolted to the ground. Pipes 8 coupled to header 9 can be provided for withdrawing distillate from the collecting troughs 10 in holding and collecting means 7.

Figure 4:
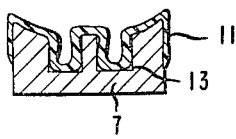
FIGURE 4 is a cross-sectional end elevation of a preferred holding and collecting means used in the solar stills.

A preferred type of holding and collecting means 7 has a polymeric insert 11 as shown in FIGURE 4. This polymeric insert prevents the canopy 1 and sealing layer 3 from chafing against the holding and collecting means 7.

The distance between the holding and collecting means 7 and the height thereof is determined by the width of canopy 1 or, if the preferred prefabricated envelope is used, the inner width of the envelope. The distance between the holding and collecting means 7 must be such that when canopy 1 is inflated the ratio of the arc length of the inflated canopy 1 to the chord of the canopy 1 is about 1.01 to 1.2 and preferably 1.01 to 1.1. "Arc length" refers to the distance measured along surface of canopy 1 between points at which canopy 1 is held in holding and collecting means 7. The chord of the canopy 1 is the shortest distance between the points where canopy 1 is held in holding and collecting means 7, that is, the chord of the arch of canopy 1. If the ratio of the arc length to chord of canopy 1 is less than 1.01, distillate collecting on the inner surface of canopy 1 refluxes rather than running down the inner surface of canopy 1 into the collecting troughs 10 in holding and collecting means 7. If this ratio is greater than about 1.2, canopy 1 forms an undesirable air foil and, air, moving across the ground over canopy 1, draws the center of canopy 1 upward and may rip canopy 1 from the still. Also, when the ratio of the diameter of the canopy 1 to the chord thereof is greater than 1.2, the efficiency of the still is reduced because solar radiation, particularly in the latter part of the day, strikes a large portion of the canopy 1 at a small angle of incidence and a considerable amount of the solar radiation is reflected rather than transmitted through canopy 1.

With long stills, after the holding and collecting means 7 have been installed, dams 12 are often placed between and perpendicular to holding and collecting means 7 at intervals along the length of the still. Such dams insure that the level of the water or other material being distilled in long stills is substantially constant along the length of the still.

Figure 2:
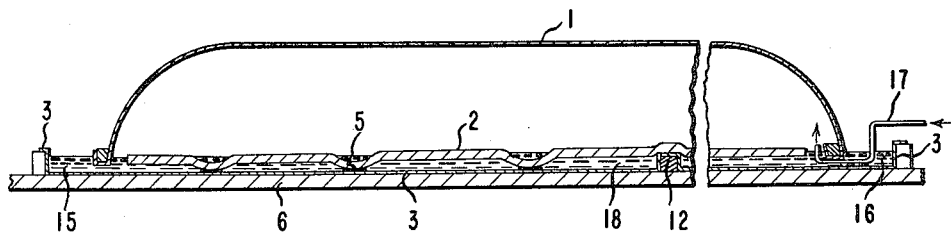
FIGURE 2 is a cross-sectional side elevation of the solar still along lines 2—2 in FIGURE 3.

Next, the lower sealing layer 3, the non-woven fabric 2 and canopy 1 are inserted in and between the holding and collecting means 7. If the preferred prefabricated envelope is used, the edges of the envelope are merely inserted in grooves 13 in the holding and collecting means 7 and suitable gaskets or wedges 14 inserted therein to pinch the edges of the canopy 1 and lower sealing layer 3 in grooves 13. Wedges 14 in grooves 13 also provide a continuous grip, that is, provide an even tension, along the length of the still thus minimizing localized stresses which result in mechanical failure. The ends of the canopy 1 and sealing layer 3 are conveniently fixed below the level of the liquid being distilled as shown in FIGURE 2.

The material to be distilled, usually salt water, is fed through feed trough 15 and into the envelope. The liquid to be distilled rising in feed trough 15 and exit trough 16 at the outlet of the still completely seals the still. Next, an inflating medium, usually air, is fed into the envelope by a suitable means, for example, pipe 17. This inflates the canopy 1 to its predetermined diameter/chord ratio. Usually, the pressure of the air within the envelope must be at least about 0.15 inch of water gauge; otherwise, the canopy 1 will flap in the wind, tear and possibly blow away. The upper limit on the pressure within the still is governed largely by the strength of canopy 1. Usually inflation pressures of 0.20 to 0.35 inch of water gauge are preferred.

In operation solar radiation transmitted through canopy 1, strikes unwoven fabric 2 where it is converted into heat. This heat is transferred by conduction and convection to material being distilled 18 which evaporates and collects on the inner surface of canopy 1 which is cooled by air moving over the outer surface thereof. The condensate then runs off into troughs 10 where it is withdrawn, for example, near the lower end of the still by pipes 8 connected to header 9. During operation, the temperature of the air within the still rises to a temperature on the order of 120 to 160° F.

The liquid being distilled 18 within the still is usually maintained about 1 to 5 inches deep, and preferably about from 2 to 4 inches deep. The loose, non-woven black fabric 2 preferably either completely floats on the surface of the liquid being distilled 18 or floats on the surface thereof between spaced points where it is held to the sealing layer 3. Wet fibers in the floating fabric 2 project from the liquid being distilled, increase the surface area of the liquid being distilled 18 and enhance evaporation. The loose non-woven structure of the fabric 2 allows salts and other organic and inorganic solid materials to fall down to the bottom of the still as they are precipitated thereby leaving the non-woven fabric 2 black and uncoated. Non-woven fabric 2 is also much more absorbent than, for example, a sheet or film of black polymeric material.

Figure 3:
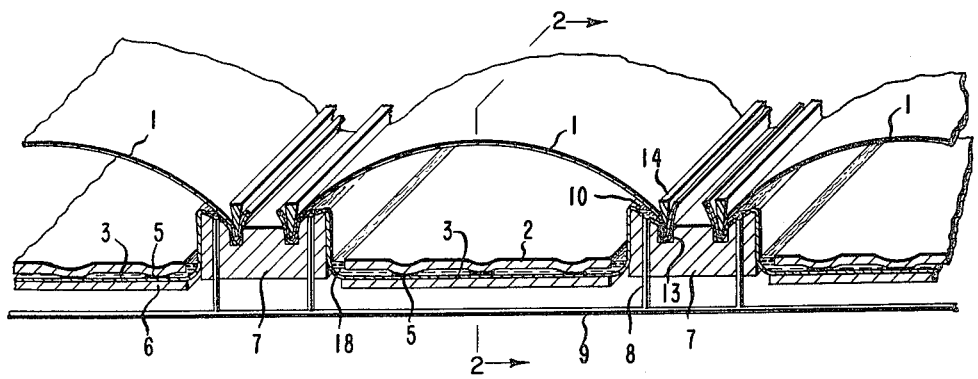
FIGURE 3 is an oblique cross-sectional view of a solar still of this invention containing several bays or individual solar stills.

The stills of this invention have outstanding efficiency. Stills capable of evaporating 0.1 or higher gallon of water per day per square foot of surface of liquid being distilled can be made. These stills can be constructed easily, conveniently and cheaply from readily obtainable materials. The stills, particularly those having a polyvinyl fluoride canopy 1 and a non-woven fabric 2 of polyacrylonitrile, will operate many years with little maintenance. The stills can be constructed of any size in single bays or in multiple bays as shown in FIGURE 3. The stills are resistant to tearing and puncture because the canopy 1 gives rather than punctures when hail or other objects fall thereon. Because the canopy 1 is inflated rather than mechanically supported, there are few points where the canopy 1 can chafe or wear. Also, because of their air-foil, the stills will withstand even gale force winds without blowing away. In addition, the loose non-woven fabric 2 in the stills of this invention prevents objectionable deposits of salt and other solids.

The following examples illustrate the utility of this invention.

EXAMPLE I

*Preparation of prefabricated envelope assembly*

A 3-mil, 96-inch wide polyvinyl fluoride film is first made wettable on one surface. This is done by passing the film through embossed calender rolls heated to 130° C. The embossing pattern consists of parallel 60° grooves at a frequency of 1400 lines per inch and having a depth of about 0.66 mil.

Next, a non-woven, loosely needled batt of 2 denier, 3-inch, black polyacrylonitrile fibers in aggregate about 0.25 inch thick, weighing about 3 ounces per square yard and about 83 inches wide is prepared. The batt is lightly sprayed with an adhesive of black polychlorobutadiene to give the resulting fabric 2 added body. Spots ¾ inch in diameter of adhesive 5 are applied to a second sheet of polyvinyl fluoride on about 12 inch centers, square pitch. The adhesive comprises 20 parts by weight of a linear terephthalic acid/sebacic acid/ethylene glycol polyester, 80 parts of chloroform and 2 parts of the reaction product of 1,1,1-trimethylol propane and tolylene diisocyanate. The non-woven fabric 2 of polyacrylonitrile fibers is then laid on and pressed into the adhesive and heated for about 2 minutes at a temperature of about 220° F. Next, the edges 4 of the film of polyvinyl fluoride bearing the non-woven fabric are coated with a layer of the aforementioned adhesive and the aforementioned film of polyvinyl fluoride with the wettable surface is laid thereon, wettable surface down. The edges 4 of the resulting envelope are pressed and the resulting structure again heated to about 220° F. for about 2 minutes to complete the bonding of the envelope.

Construction of still

A flat area is graded to a ½ degree slope in one direction and level in the other direction. Holding and collecting means 7 similar to those shown in FIGURE 4 are constructed of concrete capped with a polyethylene insert 11 and placed on the graded area. About an 83-inch spacing between inside faces of the holding and collecting means 7 is used. The height of the lip of the holding and collecting means 7 is about 4.5 inches and the width is 5.5 inches. Feed trough 15 and exit trough 16 are provided at the upper and lower end of the holding and collecting means 7. In all, 15 adjacent bays or individual stills are constructed, each about 100 feet long. The prefabricated envelope described above is cut into sections 105 feet long and fastened in the holding and collecting means 7 and feed and exit troughs 15 and 16 as shown in FIGURES 2 and 3. Neoprene grommets 14 are inserted in slots 13 to hold the prefabricated envelope. The distance between the points in the holding and collecting means at which the envelope is held, that is, the chord of canopy 1, is about 86 inches. Pipes 8 are connected through the lower sealing layer 3 at each side of the lower end of the still as indicated in FIGURE 3.

Operation of still

Salt water is pumped through feed trough 15 until the level of salt water in the still is about 3½ inches. Water filling the still fills exit trough 16 and thus seals the still. Air is pumped under canopy 1 through pipe 7 inflating canopy 1. After inflation, the ratio of the arc length of canopy 1 to the chord thereof is about 1.1. The air pressure within the still is about 0.2 inch of water gauge. The total water area of the 15 bays of the still is about 10,300 square feet.

Solar radiation passing through canopy 1 and heating non-woven fabric 2 evaporates salt water 18. Distillate collects on the inner surface of canopy 1, flows down the inner surface thereof and collects in trough 10 from which it passes through pipes 8 into header 9 from which it is withdrawn for use. On an average summer day, the 15 bays of the above still produce about 0.15 gallon of fresh water per square foot of exposed salt water or a total of about 1500 gallons per day. The above still will operate for many years with little or no maintenance other than flushing the stills, for example, weekly, to remove concentrated brine which is produced in the still and maintaining the product withdrawing and air feeding means. High winds, hail and other weather conditions do not puncture, tear or otherwise injure the still. Solids filter down through the non-woven fibers in fabric 2 during operation and collect on the bottom of the still leaving the non-woven fabric 2 black and heat absorbent.

If non-woven fabric 2 is omitted and a black polyethylene film is substituted therefor or the bottom of the still is painted black, the output of the still is decreased about 30% initially. After about 3 weeks, the output of the still as compared with the still of this invention described above is about 40% less. The decrease in output is caused by salt and other solid materials depositing on the surface of a polyethylene film or painted bottom of the still causing solar radiation to be reflected rather than absorbed.

EXAMPLE II

Three solar stills similar to that described in Example I are constructed as described in that example. In the first still the inner surface of canopy 1 is not modified; otherwise, the still is the same as the still described in Example I. In the second and third stills unmodified films of polyethylene terephthalate and polyethylene, respectively, are substituted for the polyvinyl fluoride films used for the canopy 1 and sealing layer 3 in the still of Example I. On an average summer day in Delaware, the first still having an unmodified polyvinyl fluoride canopy 1 has an output of about 0.07 gallon per square foot per day. The stills with the polyethylene terephthalate and polyethylene have outputs of about 0.07 and 0.06 gallon per square foot per day, respectively.

If the inner surface of the canopies 1 of the stills described in this example are made wettable with silica particles as previously described, the output of the stills is increased about 20%.

EXAMPLE III

Solar stills similar to that described in Example I are constructed and operated as described in that example having still widths, optimum arch to chord ratios and productivity of water as shown in the following Table I:

TABLE I

| Still Width, Feet | Optimum Arc to Chord Ratio | Production of Water, Gal./day, ft.²/2,000 B.t.u. day |
|---|---|---|
| 3 | 1.110 | 0.163 |
| 6 | 1.045 | 0.160 |
| 9 | 1.020 | 0.150 |
| 12 | 1.015 | 0.140 |
| 15 | 1.012 | 0.135 |

To show the criticality of the arc to chord ratio, the ratio of the 12 foot wide still was varied to points higher and lower than the optimum value given in the above table. The results are as shown in Table II.

TABLE II

| Arc to Chord Ratio | Productivity of Water, Gal./day, ft.²/2,000 B.t.u. day |
|---|---|
| 1.017 | 0.13, too high a crown. |
| 1.015 | 0.14, optimum. |
| 1.013 | 0.11, too low a crown. |

As can be seen from Table II, the water productivity drops off if the arc to chord ratio is higher or lower than the optimum value. In all cases, an arc to chord ratio below 1.01 for any width of still between 3 to 15 feet wide results in refluxing of the distillate with the efficiency of the still appreciably reduced. Also when the arc to chord ratio is greater than 1.2, the efficiency of the still is appreciably reduced to an insufficient level.

This application is a continuation-in-part of my copending application Serial No. 8,862, filed February 15, 1960, now abandoned.

I claim:

A solar still which comprises a flexible, substantially transparent, polyvinyl fluoride film elongated and bent across the width thereof to form an arched canopy having a width within the range of about 3 to 15 feet when bent and an arc length of about 1.01 to 1.2 times the width, the inner surface of said canopy being wettable; a bottom layer of sealable thermoplastic film having two opposing edges sealed to the inner lengthwise edges of said canopy, the adjacent widthwise edges of said canopy and bottom layer spaced from one another to provide two openings to the still and which allows the water being distilled to enter at one end and exit at the other end, said water being distilled forming an air seal between the canopy and bottom layer at the open ends; canopy inflation means inserted through one open end of the still to support said canopy by air at a pressure of at least 0.15 inch of water gauge; means running along the sealed edges of said canopy and bottom layer to hold said canopy and capable of shaping troughs from the bottom layer parallel and adjacent each longitudinal edge thereof to collect distillate condensing on the inner surface of the canopy; distillate collection means inserted through one open end of the still to withdraw the distillate from said collection troughs; and a non-woven black fabric of polyacrylonitrile fibers having a density of about from 0.001 to 0.03 oz./in.$^3$ disposed beneath said canopy, spot bonded to said bottom layer and floating on the water being distilled.

References Cited by the Examiner

UNITED STATES PATENTS 2,402,737 6/46 Delano.
2,412,466 12/46 Miller.
2,848,389 8/58 Bjorksten.

OTHER REFERENCES

"Symposium on Saline Water Conversion," Publication 568, National Academy of Sciences, National Research Council, Washington, D.C., 1958, pages 118–119.

"Solar Energy Research," Daniels et al., University of Wisconsin Press, Madison, Wisconsin, 1955, pages 111–113.

NORMAN YUDKOFF, *Primary Examiner.*

GEORGE D. MITCHELL, *Examiner.*